(12) United States Patent
McBrien et al.

(10) Patent No.: US 11,287,154 B2
(45) Date of Patent: Mar. 29, 2022

(54) DUCTING SYSTEM WITH VALVE HEALTH MONITOR

(71) Applicant: Hamilton Sundstrand Corporation, Charlotte, NC (US)

(72) Inventors: Gary M. McBrien, South Glastonbury, CT (US); Peter A. Dorian, West Hartford, CT (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 269 days.

(21) Appl. No.: 16/692,469

(22) Filed: Nov. 22, 2019

(65) Prior Publication Data
US 2021/0156581 A1 May 27, 2021

(51) Int. Cl.
| | |
|---|---|
| *F24F 11/38* | (2018.01) |
| *F16K 37/00* | (2006.01) |
| *G05D 23/20* | (2006.01) |
| *G05D 23/22* | (2006.01) |
| *G05D 23/13* | (2006.01) |

(52) U.S. Cl.
CPC .......... *F24F 11/38* (2018.01); *F16K 37/0041* (2013.01); *G05D 23/1393* (2013.01); *G05D 23/2039* (2013.01); *G05D 23/22* (2013.01)

(58) Field of Classification Search
CPC ...... F24F 11/38; F16K 37/0041; G05D 23/13; G05D 23/138; G05D 23/1393; G05D 23/2039; G05D 23/22
See application file for complete search history.

(56) References Cited

U.S. PATENT DOCUMENTS

| | | | |
|---|---|---|---|
| 3,902,315 A | 9/1975 | Martin | |
| 3,921,435 A | 11/1975 | Howard | |
| 4,164,172 A * | 8/1979 | Anderten | G05D 21/02 |
| | | | 454/229 |
| 5,067,094 A | 11/1991 | Hayes | |

(Continued)

FOREIGN PATENT DOCUMENTS

EP 3165462 A1 5/2017

OTHER PUBLICATIONS

European Search Report for EP Application No. 20206631.2 dated Apr. 16, 2021.

(Continued)

*Primary Examiner* — Marc E Norman
(74) *Attorney, Agent, or Firm* — Carlson, Gaskey & Olds, P.C.

(57) ABSTRACT

A ducting system has a first upstream location is to be connected to a first source of air. A downstream location in the duct is to be connected to a second source of air. The upstream location has a first valve, and the downstream location has a second valve. An end location of the duct is to be connected to a sink. A control for the valves achieves a desired pressure and temperature of air at the end location. The first temperature sensor is located at a position intermediate the upstream location and the downstream location. A second temperature sensor is located at a position intermediate the downstream location and the end location. A control is programmed to determine the health of the first and second valves based upon a difference between temperatures sensed by the first and second sensors. An air use system and a method are also disclosed.

20 Claims, 3 Drawing Sheets

(56) References Cited

U.S. PATENT DOCUMENTS

| | | | |
|---|---|---|---|
| 5,971,287 A * | 10/1999 | Kettner | B60H 1/00742 |
| | | | 165/230 |
| 2015/0251766 A1 | 9/2015 | Atkey | |
| 2016/0349117 A1 | 12/2016 | Castro et al. | |
| 2019/0136492 A1 | 5/2019 | Trescott et al. | |
| 2019/0309683 A1 | 10/2019 | Mackin et al. | |
| 2021/0156745 A1 * | 5/2021 | McBrien | G01K 7/02 |

OTHER PUBLICATIONS

European Search Report for EP Application No. 20208482.8 dated Apr. 15, 2021.

* cited by examiner

DUCTING SYSTEM WITH VALVE HEALTH MONITOR

BACKGROUND

This application relates to a ducting system for mixing air supplies and a way of checking the health of valves associated with the system.

Ducting systems are utilized in any number of applications. In one known ducting system, a first supply of air at a lower pressure and temperature is supplied through a selectively open valve to a sink of air. A second source of relatively higher pressure and temperature air is supplied to the sink through its own selectively opened valve.

The two valves can be controlled to achieve a desired temperature and pressure of the air supplied to the sink.

SUMMARY

A ducting system has an upstream location to be connected to a first source of air. A downstream location in the duct is to be connected to a second source of air. The upstream location has a first valve, and the downstream location has a second valve. An end location of the duct is to be connected to a sink. A control is configured for controlling the first and second valve to achieve a desired temperature of air at the end location. The first temperature sensor is located at a position intermediate the upstream location and the downstream location. A second temperature sensor is located at a position intermediate the downstream location and the end location. A control is programmed to determine the health of the first and second valves based upon a difference between temperatures sensed by the first and second sensors.

An air use system and a method are also disclosed.

These and other features may be best understood from the following drawings and specification.

DETAILED DESCRIPTION

Figure 1:
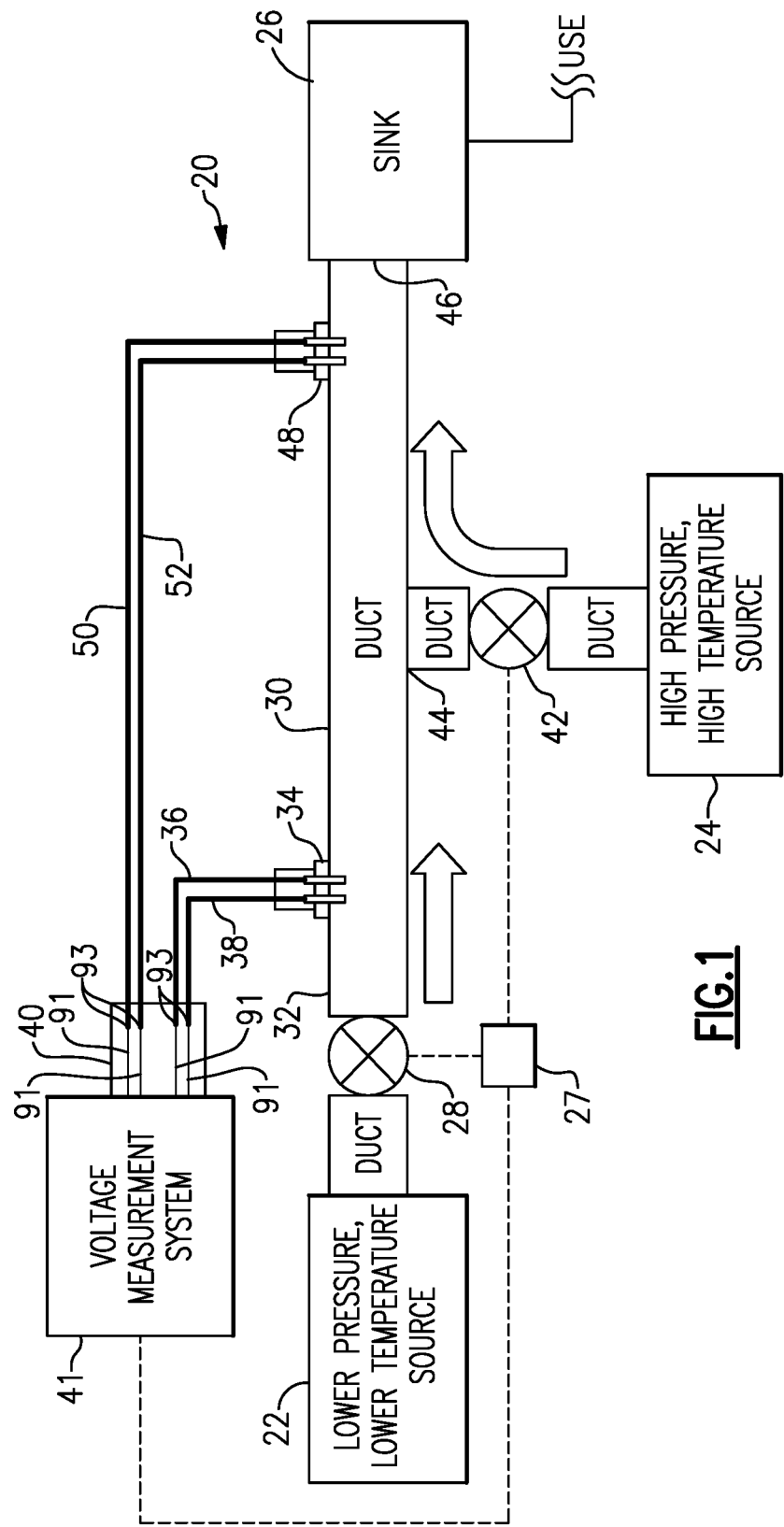
FIG. 1 shows a first system for monitoring valve health.

FIG. 1 shows a first embodiment ducting system 20. A first air source 22 is at a relatively low pressure and temperature. A second air source 24 is at a relatively higher pressure and higher temperature than the pressure and temperature of first air source 22. A sink 26 receives a mixture of air from the sources 22 and 24.

One application of the sink 26 is for air frame purposes on an aircraft. As known, aircraft have any number of systems which require air at a desired pressure and temperature. These are identified as USE in the Figures.

Control 27 communicates with a first valve 28 controlling the flow from the first air source 22 into a duct 30 at an upstream location 32. The control 27 also controls a second valve 42 for supplying air from the second air source 24 into the duct 30 at a downstream location 44. Downstream location 44 is downstream of the upstream location 32 where the lower pressure/temperature source 22 enters the duct 30. The air is then passed to the sink 26 at an end location 46 of the duct 30.

In other embodiments the upstream location can be connected to the higher pressure/temperature source 24, with the downstream location connected to the lower pressure/temperature source 22.

Control 27 is programmed as known to control the valves 28 and 42 to mix the air at the two temperatures and pressures to arrive at a desired pressure and temperature for the air supplied to the sink 26.

Control 27 is also shown communicating with voltage measurement system 41. A junction 40 receives signals from a first temperature sensor 34, which is at a location intermediate the upstream location 32 and the downstream location 44. Thus, temperature sensor 34 is sensing the temperature of the air supplied only from the first source 22.

A second temperature sensor 48 is located downstream of the location 44, and intermediate the downstream location 44 and the end location 46. As such, sensor 48 will measure the temperature of what might be a mixed air flow.

Control 27 may close one of the two valves 28, 42 or leave them both partially open. Control 27 will be able to calculate a predicted temperature difference that should exist between the temperatures sensed at 34 and 48 based upon the status of the valves 28 and 42. This disclosure utilizes that predicted difference and an actual difference, to provide feedback on the health of the valves 28 and 42.

In one embodiment, the sensors 34 and 48 are so-called thermocouple sensor which will translate a sensed temperature into a voltage.

Sensor 34 has a pair of wires, a first wire 36 that may be alumel and a second wire 38 that may be chromel. These two wires are communicated to junction 40.

The sensor 48 also communicates through a pair of wires, a wire 50, which may be alumel, and a wire 52, which may be chromel.

All four wires transition to copper wires 91 at points 93 within junction 40.

One of the two voltage signals supplied to the system 41 can then be subtracted from the other, and a difference identified. The control 27 can utilize that difference to predict whether the valves 28 and 42 are operating as desired. If the difference is off from a predicted difference by more than a predetermined amount, then a determination may be made that one of the valves 28/42 may not be operating properly. As an example, should the valve 42 be properly closed and there is a significant difference between the temperatures sensed by sensors 34 and 48, this is indicative that the valve 42 may be improperly open. Conversely, if the valve 28 is intended to be closed, but the difference sensed by sensors 34 and 48 is not as much as expected, this might be an indication that the valve 28 is not operating properly. As can be appreciated the predicted difference is determined based upon an intended position of the valves 28 and 42.

By comparing the temperature sensed by sensors 34 and 48 to each other, rather than a reference number, more accuracy is achieved. Known temperature sensors typically include a so called "cold junction" at which a sensor wire connects to a copper wire extending into a control or measurement system. The cold junction would include a temperature sensor for measuring the temperature at the cold junction. Algorithms are then utilized to determine the temperature sensed by the main sensor but utilizing this cold junction temperature.

Figure 2:
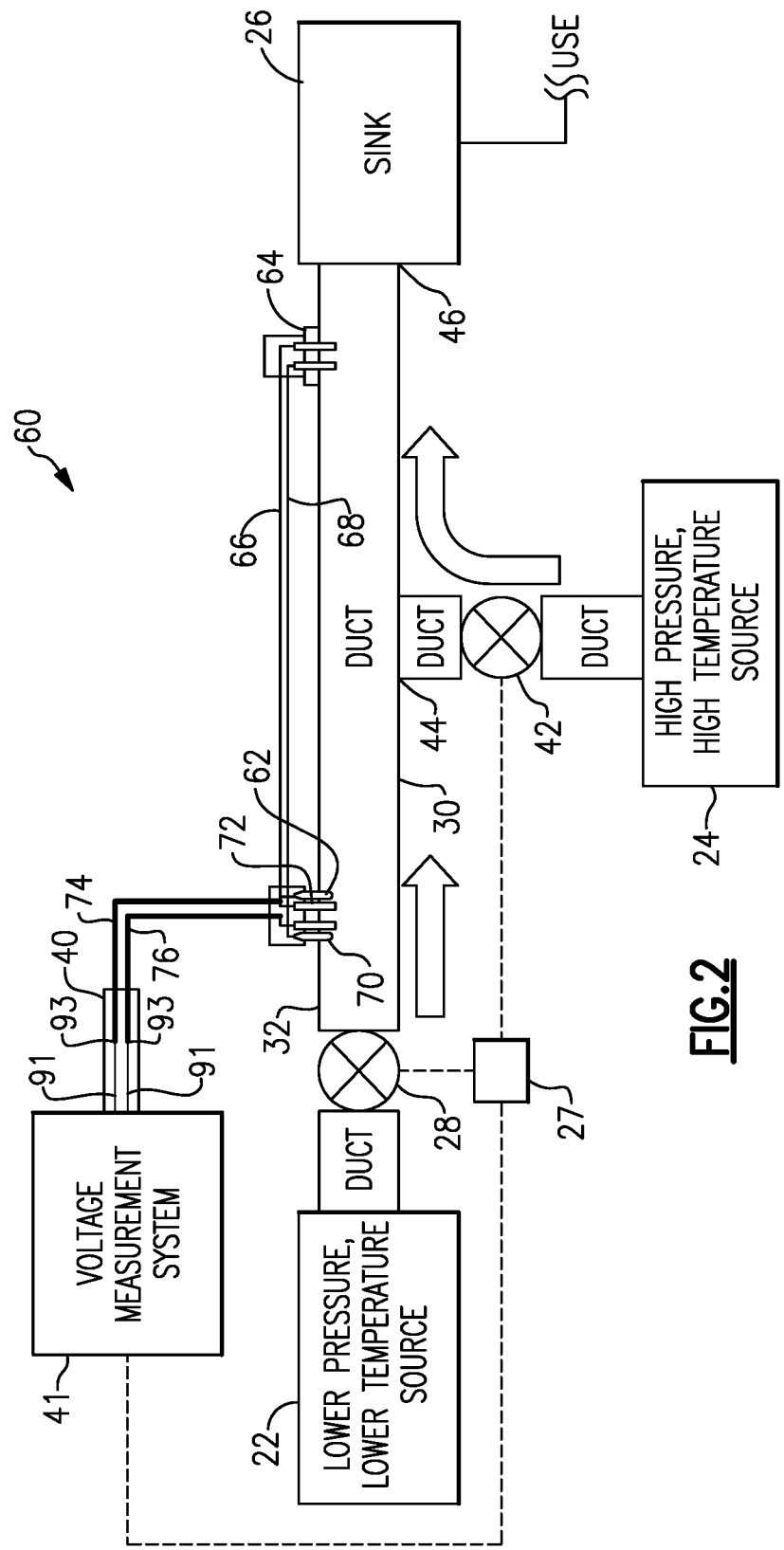
FIG. 2 shows a second embodiment system for monitoring valve health.

FIG. 2 shows a ducting system 60. Elements which are similar to the system 20 are identified by identical numbers. What is distinct from the FIG. 1 embodiment here is the sensor 64 downstream of downstream location 44 now has an alumel wire 66 and a chromel wire 68, which each communicate to the sensor 62. In fact, those wires connect to wires 74 and 76, which communicate from the sensor 62 to the measurement system 41. Based on the physics of thermocouple materials and, in particular, a phenomenon known as the Seebeck effect, the voltage of wires 74 and 76 will be indicative of a temperance difference between sensors 62 and 64. If the temperature from sensor 64 is different than the temperature from sensor 62, then a voltage will be sensed and that voltage will be indicative of the amount of difference in the temperature sensed by sensors 62 and 64. By sensing a difference, and supplying only that difference to measurement system 41, greater accuracy is achieved. Of course, sensor 62 can send its pair of wires and signal to sensor 64.

Figure 3:
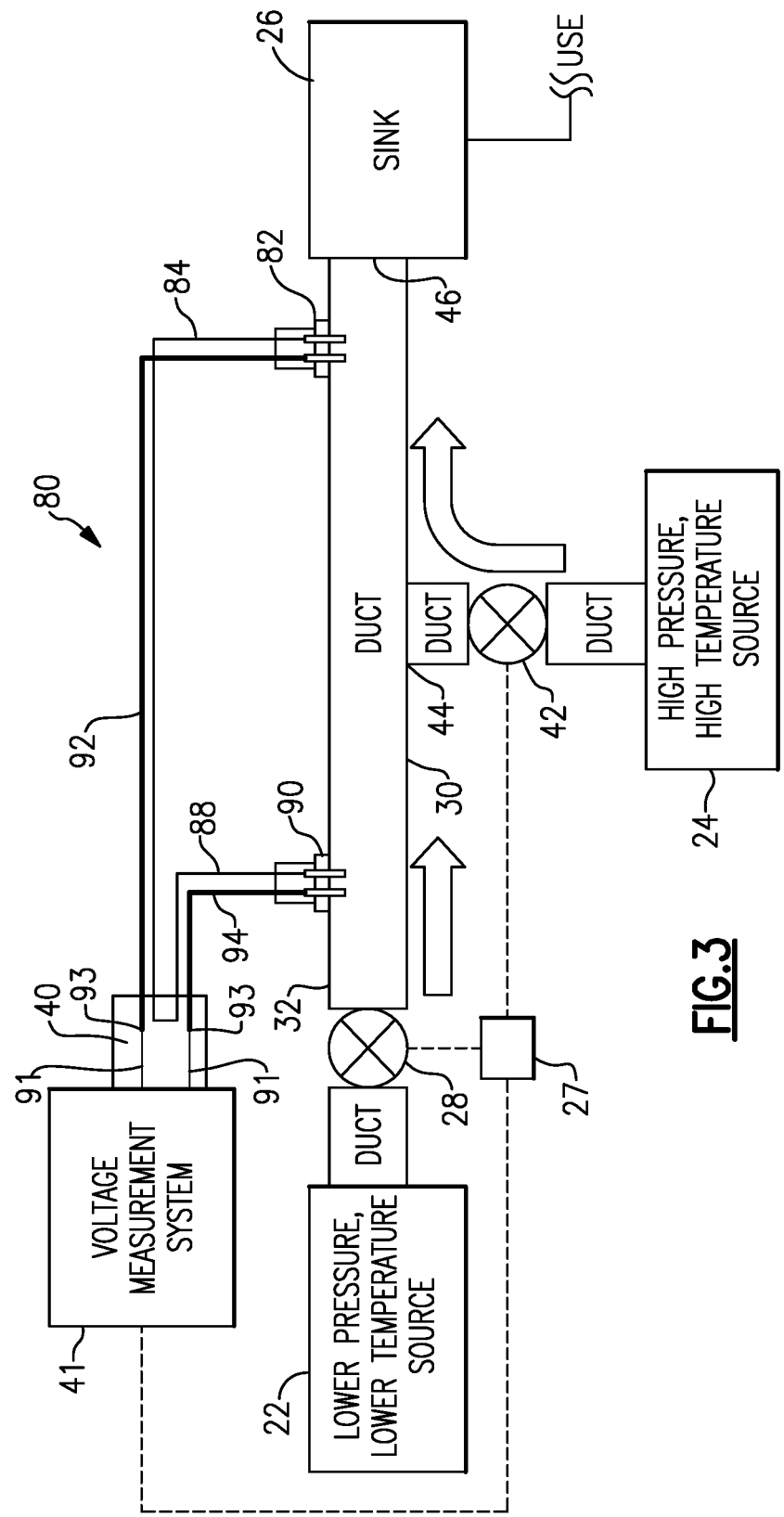
FIG. 3 shows a third embodiment system for monitoring valve health.

FIG. 3 shows yet another embodiment 80. The downstream sensor 82 has an alumel wire 84, which communicates as a connection 88 to the upstream sensor 90. Sensor 82 has its own chromel wire 92 extending to a connection 93 with a copper wire 91 at junction 40. Sensor 90 has its own chromel wire 94 communicating to a copper wire C at junction A within a cold junction 86.

Essentially, there is a loop voltage on the entire circuit from one wire 84/82 which will be representative of the net voltage difference corresponding to the different in temperature between sensors 82 and 90. This can be shown utilizing the voltage law for Thevenien voltage circuit loop.

A ducting system under this disclosure could be said to include a first upstream location to be connected to a first source of air. A downstream location in the duct is to be connected to a second source of air. The upstream location has a first valve, and the downstream location has a second valve. An end location of the duct is to be connected to a sink. The first source of air and the second source of air will be at different temperature. A control is configured to control the first and second valve to achieve a desired pressure and temperature of air at the end location. The first temperature sensor is located at a position intermediate the upstream location and the downstream location. A second temperature sensor is located at a position intermediate the downstream location and the end location. A control is programmed to determine the health of the first and second valves based upon a difference between temperatures sensed by the first and second sensors. As to the term "intermediate" as used in this application, the two locations should be interpreted to include a sensor located at the location.

A method of monitoring valve health under this disclosure could be said to include the steps of selectively connecting a first source of air at a first temperature through a first valve to a duct at a first upstream location. The method also includes the step of selectively connecting a second source of air at a second temperature distinct from the first temperature through a second valve to a downstream location in the duct. An end location of the duct is connected to a sink of air. The method includes the steps of controlling the first and second valve to achieve a desired pressure and temperature of air at the end location. The method includes the step of sensing a first temperature at a position intermediate the upstream location and the downstream location, and sensing a second temperature at a position intermediate the downstream location and the end location. A temperature difference between the first and second temperatures is determined. The health of the first and second valves is determined based upon a comparison of the difference between the first and second temperatures to a predicted temperature difference. The predicted temperature difference is based upon an intended position of the first valve and the second valve.

The control may be any type of electronic controller programmed to achieve the disclosed features.

While the specific temperature difference measurement systems as disclosed in this application may provide more accurate determination of the health of the first and second valves, the prior art temperature difference measurement systems may also be beneficial, and would benefit from the teachings of this disclosure.

Although an embodiment of this invention has been disclosed, a worker of ordinary skill in this art would recognize that certain modifications would come within the scope of this disclosure. For that reason, the following claims should be studied to determine the true scope and content of this disclosure.

The invention claimed is:

1. A ducting system comprising:
   a first upstream location in a duct to be connected to a first source of air;
   a downstream location in said duct to be connected to a second source of air;
   said upstream location having a first valve, and said downstream location having a second valve;
   an end location of said duct to be connected to a sink;
   a control configured for controlling said first and second valve to achieve a desired temperature of air at said end location; and
   a first temperature sensor located at a position intermediate said upstream location and said downstream location, and a second temperature sensor located at a position intermediate said downstream location and said end location, and said control being programmed to determine the health of said first and second valves based upon a difference between temperatures sensed by said first and second sensors.

2. The ducting system as set forth in claim 1, wherein the first source of air is at a first temperature, and the second source of air is at a second temperature, and said second temperature being higher than said first temperature.

3. The ducting system as set forth in claim 2, wherein said difference between temperatures sensed by said first and second sensors is compared to a predicted temperature difference, said predicted temperature difference being based upon an intended position of said first valve and said second valve.

4. The ducting system as set forth in claim 1, wherein each of said first and second sensors communicate to a measurement system through respective pairs of wires, said measurement system for determining the difference between the temperatures sensed by first said and second sensors, and communicating the difference to said control.

5. The ducting system as set forth in claim 4, wherein one wire from each of said pair of wires from said first and second temperature sensors is alumel, and a second wire from each of said first and second temperature sensors is chromel, and there is a connection between each of said alumel and chromel wires and an individual copper wire at a junction to said measurement system.

6. The ducting system as set forth in claim 4, wherein said pair of wires from said second temperature sensor communicate to said first temperature sensor, said pair of wires from said first temperature sensor extend to said measurement system, such that a temperature difference between the temperatures sensed at said first and second temperature sensors are proportional to a voltage supplied by said pair of wires from said first temperature sensor to said measurement system.

7. The ducting system as set forth in claim 6, wherein one wire of said pair of wires connecting said second temperature sensor to said first temperature sensor is chromel and a second of said wires connecting said second temperature sensor to said first temperature sensor is alumel.

8. The ducting system as set forth in claim 4, wherein one wire of said pair of wires from each of said first and second temperature sensors communicates to a junction associated with said measurement system, and a second wire of said pair of wires of each of said first and second temperature sensors is a common wire that connects said second temperature sensor to said first temperature sensor.

9. The ducting system as set forth in claim 8, wherein said common wire is alumel, and said one wire communicating each of said downstream and upstream sensors to said measurement system is chromel.

10. The ducting system as set forth in claim 1, wherein said first and second temperature sensors are thermocouple temperature sensors.

11. An air use system comprising:
a duct having a first upstream location connected to a first source of air;
a downstream location in said duct connected to a second source of air;
said first source communicating to said upstream location through a first valve, and said second source communicating to said downstream location through a second valve;
an end location of said duct connected to a sink of air;
said sink of air to be connected to a use for air on an aircraft;
said first source of air and said second source of air being at different temperatures;
a control configured for controlling said first and second valve to achieve a desired pressure and temperature of air at said end location; and
a first temperature sensor located at a position intermediate said upstream location and said downstream location, and a second temperature sensor located at a position intermediate said downstream location and said end location, and said control for sensing a temperature difference between said temperature sensed by said first and second temperature sensor, and said control being programmed to determine the health of said first and second valves based upon a difference between said temperatures sensed by said first and second sensors.

12. The air use system as set forth in claim 11, wherein each of said first and second sensors communicate to a measurement system through respective pairs of wires, said measurement system for determining the difference between the temperatures sensed by said first and second sensors, and communicating the difference to said control.

13. The air use system as set forth in claim 12, wherein one wire from each of said pair of wires from said first and second temperature sensors is alumel, and a second wire from each of said first and second temperature sensors is chromel, and there is a connection between each of said alumel and chromel wires and an individual copper wire at a junction to said measurement system.

14. The air use system as set forth in claim 12, wherein said pair of wires from said second temperature sensor communicate to said first temperature sensor, said pair of wires from said first temperature sensor extend to said measurement system, such that a temperature difference between the temperatures sensed at said first and second temperature sensors are proportional to a voltage supplied by said pair of wires from said first temperature sensor to said measurement system.

15. The air use system as set forth in claim 14, wherein one wire of said pair of wires connecting said second temperature sensor to said first temperature sensor is chromel and a second of said wires connecting said second temperature sensor to said first temperature sensor is alumel.

16. The air use system as set forth in claim 12, wherein one wire of said pair of wires from each of said first and second temperature sensors communicates to a junction associated with said measurement system, and a second wire of said pair of wires of each of said first and second temperature sensors is a common wire that connects said second temperature sensor to said first temperature sensor.

17. The air use system as set forth in claim 16, wherein said common wire is alumel, and said one wire communicating each of said downstream and upstream sensors to said measurement system is chromel.

18. The air use system as set forth in claim 17, wherein said first and second temperature sensors are thermocouple temperature sensors.

19. The air use system as set forth in claim 11, wherein said difference between temperatures sensed by said first and second sensors is compared to a predicted temperature difference, said predicted temperature difference being based upon an intended position of said first valve and said second valve.

20. A method of monitoring valve health comprising the steps of:
selectively connecting a first source of air at a first temperature through a first valve to a duct at a first upstream location;
selectively connecting a second source of air at a second temperature distinct from said first temperature through a second valve to a downstream location in said duct;
connecting an end location of said duct to a sink of air;
controlling said first and second valve to achieve a desired pressure and temperature of air at said end location; and
sensing a first temperature at a position intermediate said upstream location and said downstream location, and sensing a second temperature at a position intermediate said downstream location and said end location, and determining a temperature difference between said first and second temperatures, and determining the health of said first and second valves based upon a comparison of said difference between said first and second temperatures to a predicted temperature difference, said predicted temperature difference being based upon an intended position of said first valve and said second valve.

* * * * *